United States Patent [19]

Coe et al.

[11] Patent Number: 4,732,584
[45] Date of Patent: Mar. 22, 1988

[54] PROCESS FOR THE PURIFICATION OF PERMANENT GASES USING CHABAZITE ADSORBENTS

[75] Inventors: Charles G. Coe, Macungie; David A. Roberts, Allentown, both of Pa.

[73] Assignee: Air Products and Chemicals, Inc., Allentown, Pa.

[21] Appl. No.: 53,283

[22] Filed: May 22, 1987

Related U.S. Application Data

[63] Continuation-in-part of Ser. No. 866,544, May 22, 1986, abandoned.

[51] Int. Cl.$^4$ .............................................. B01D 53/04
[52] U.S. Cl. .......................................... 55/66; 55/68; 55/75
[58] Field of Search ...................... 55/66, 68, 75, 389; 502/56, 64, 78–80, 85

[56] References Cited

FOREIGN PATENT DOCUMENTS 841812  7/1960  United Kingdom .

OTHER PUBLICATIONS

Donald W. Breck, Zeolite Molecular Sieves, 1974, John Wiley & Sons, pp. 107–110, 139, 212, 432, 605, 617, 637, 638, 651, 653, 657, 665–668, 688.

*Primary Examiner*—Robert Spitzer
*Attorney, Agent, or Firm*—Willard Jones, II; James C. Simmons; William F. Marsh

[57] ABSTRACT

Thoroughly dehydrated, certain forms of chabazite have improved utility for purifying bulk gases. Compared to conventional molecular sieves, these chabazites have improved properties for removing low levels of gas contaminants having larger heats of adsorption than the bulk component. Also, the small pore chabazite can remove weakly interacting adsorbates from bulk gases having kinetic diameters which exceed that of the pore opening. This discovery of the intrinsic properties of polyvalent chabazites expands the range of contaminant gases which can be removed from bulk gases economically using standard adsorption processes, e.g. using these adsorbents it is possible to remove trace nitrogen from argon.

7 Claims, 9 Drawing Figures

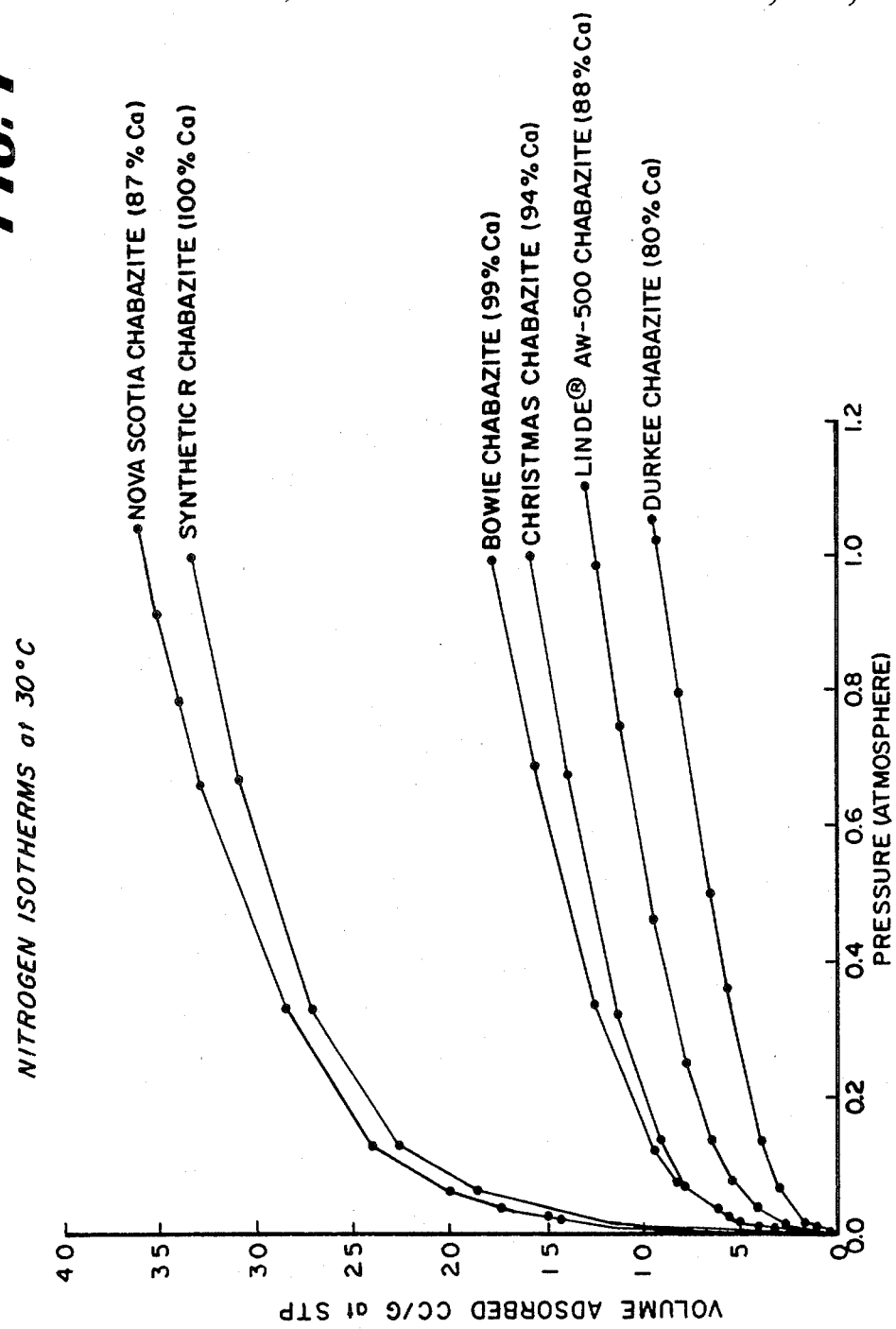

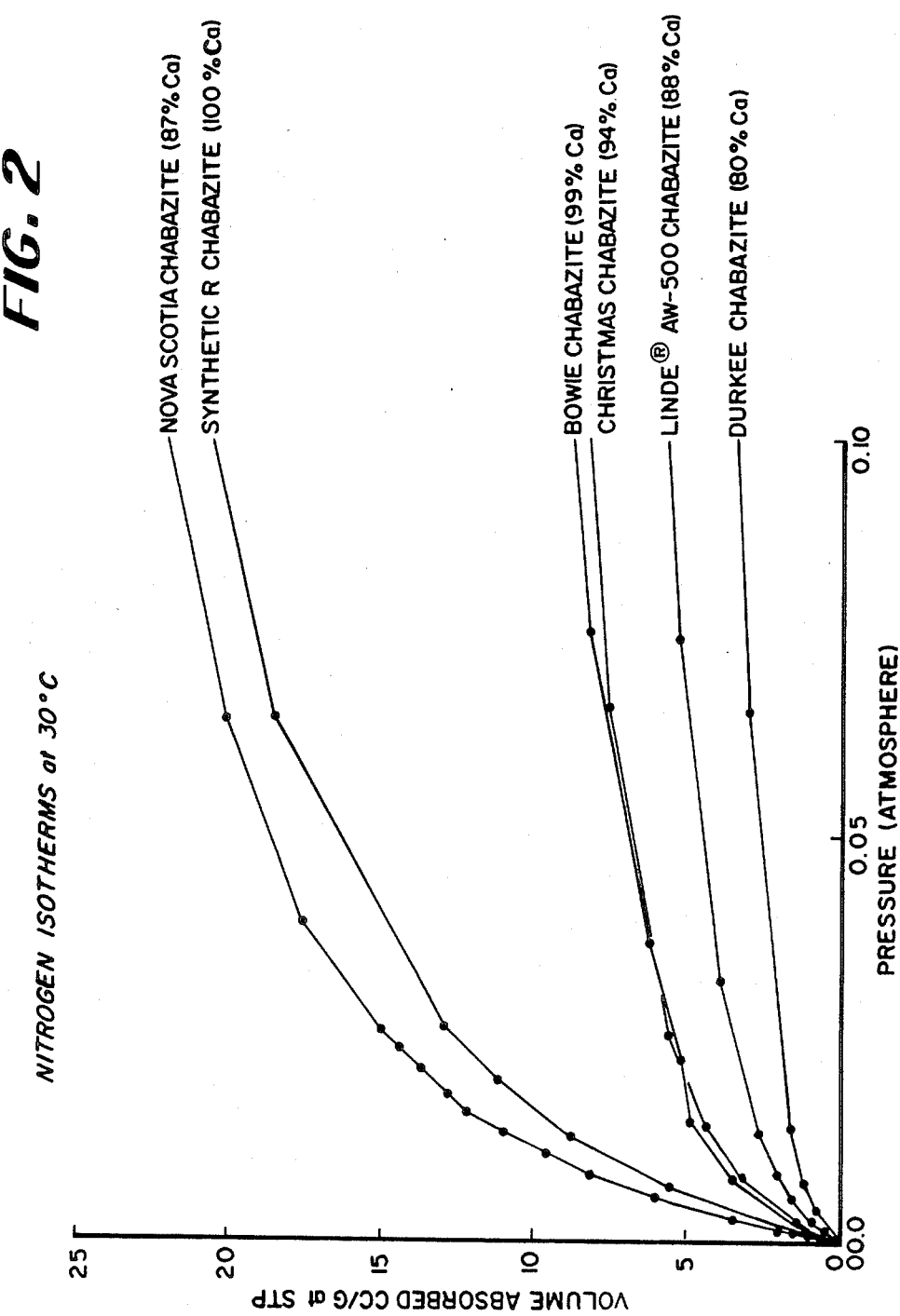

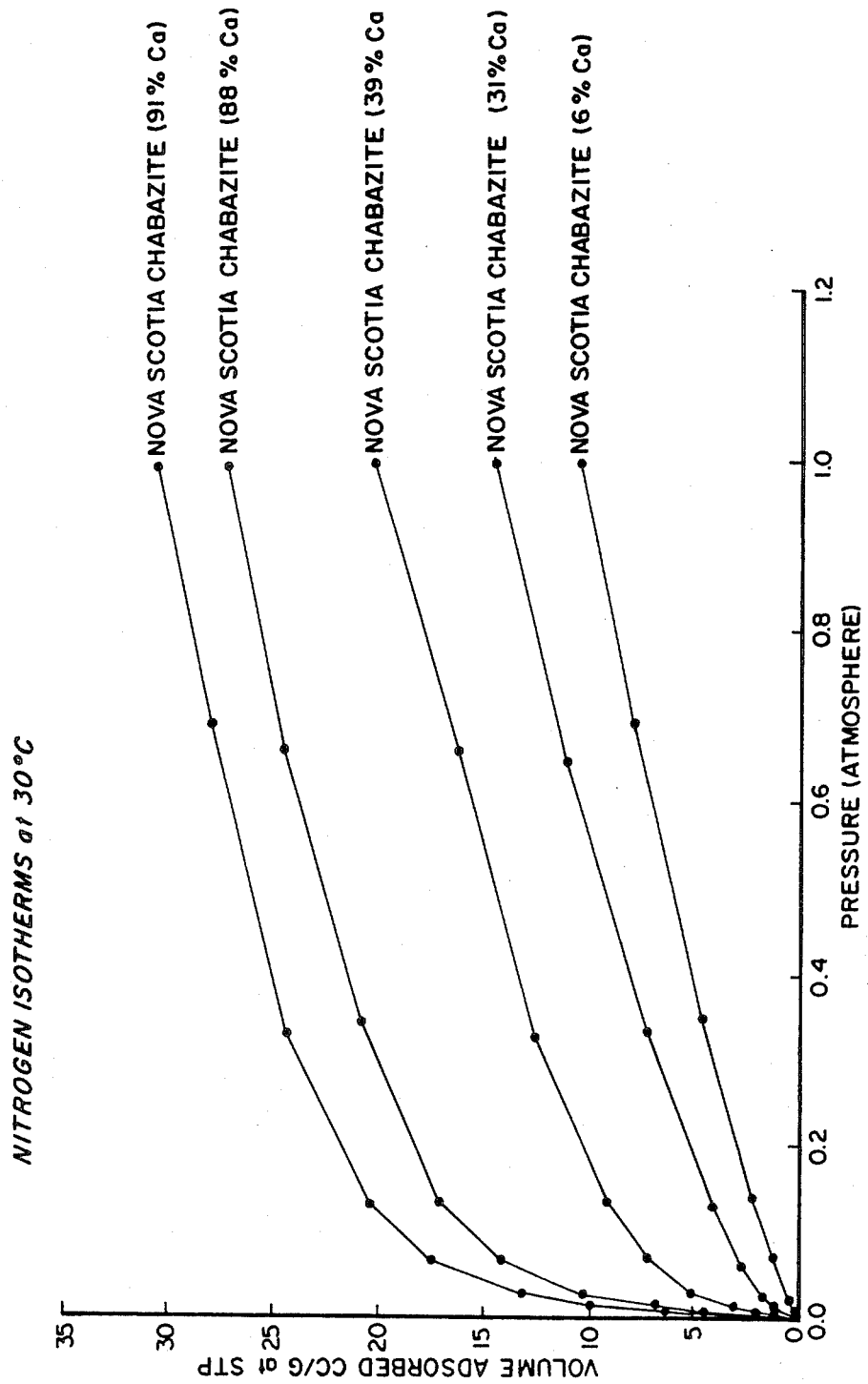

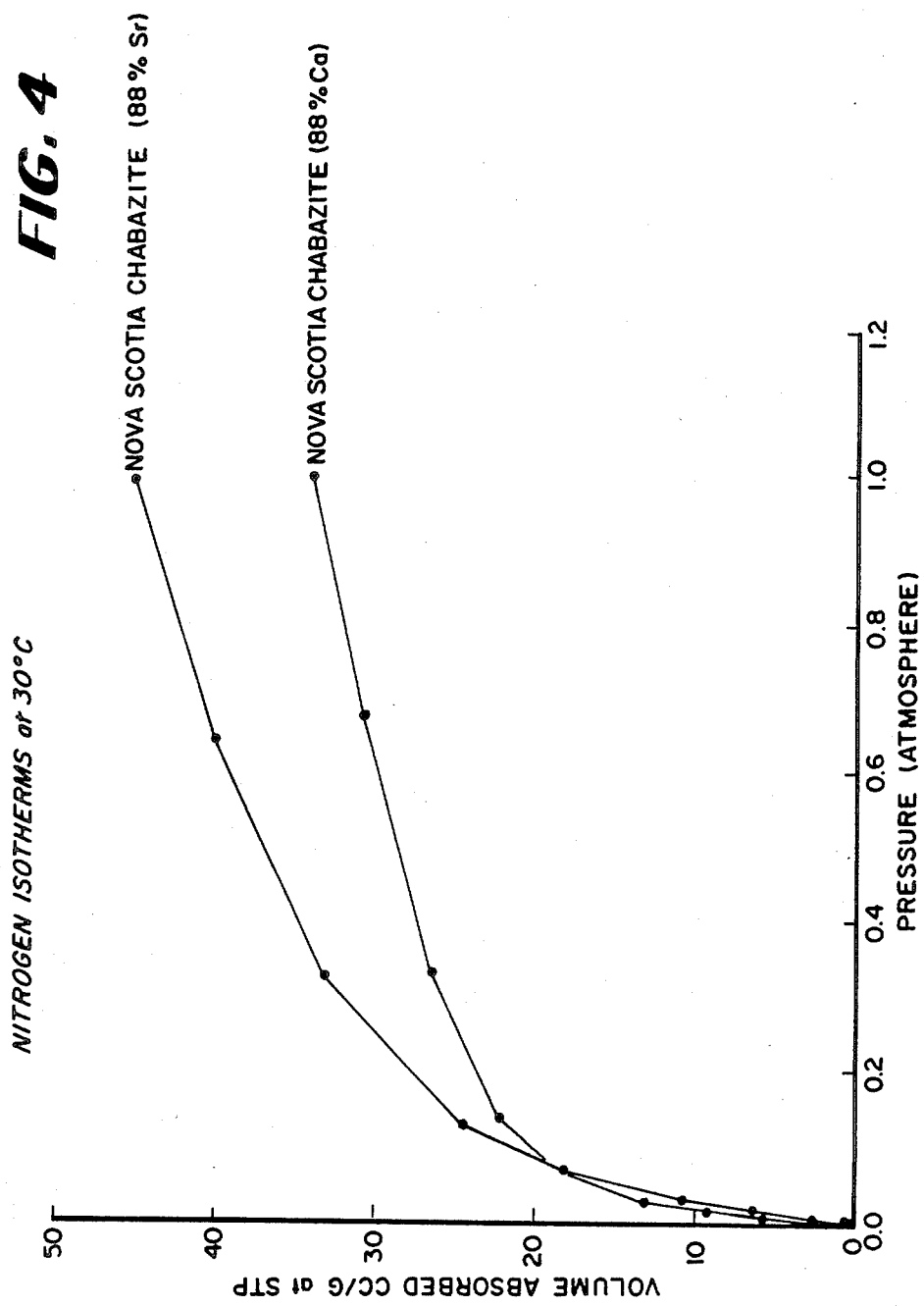

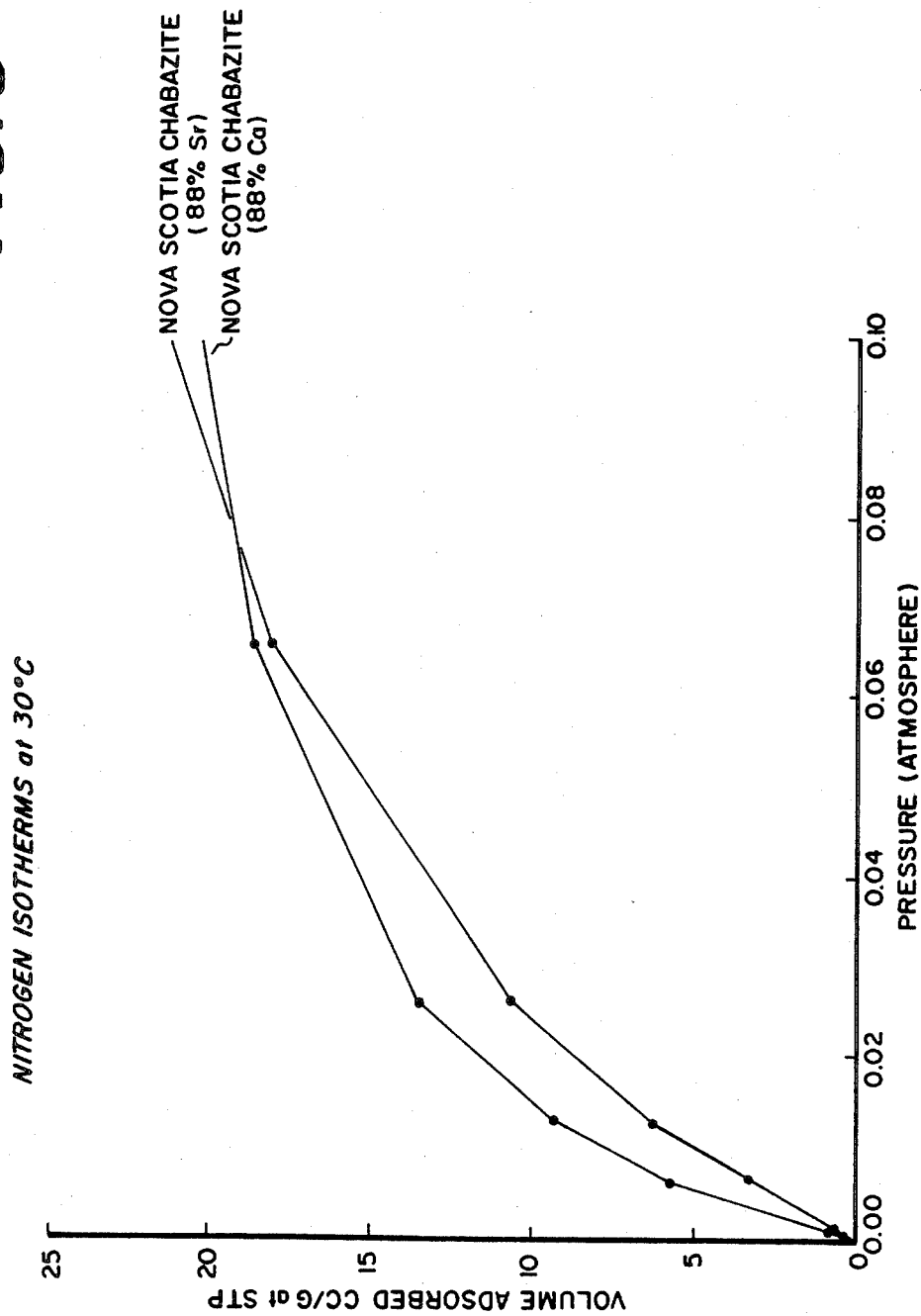

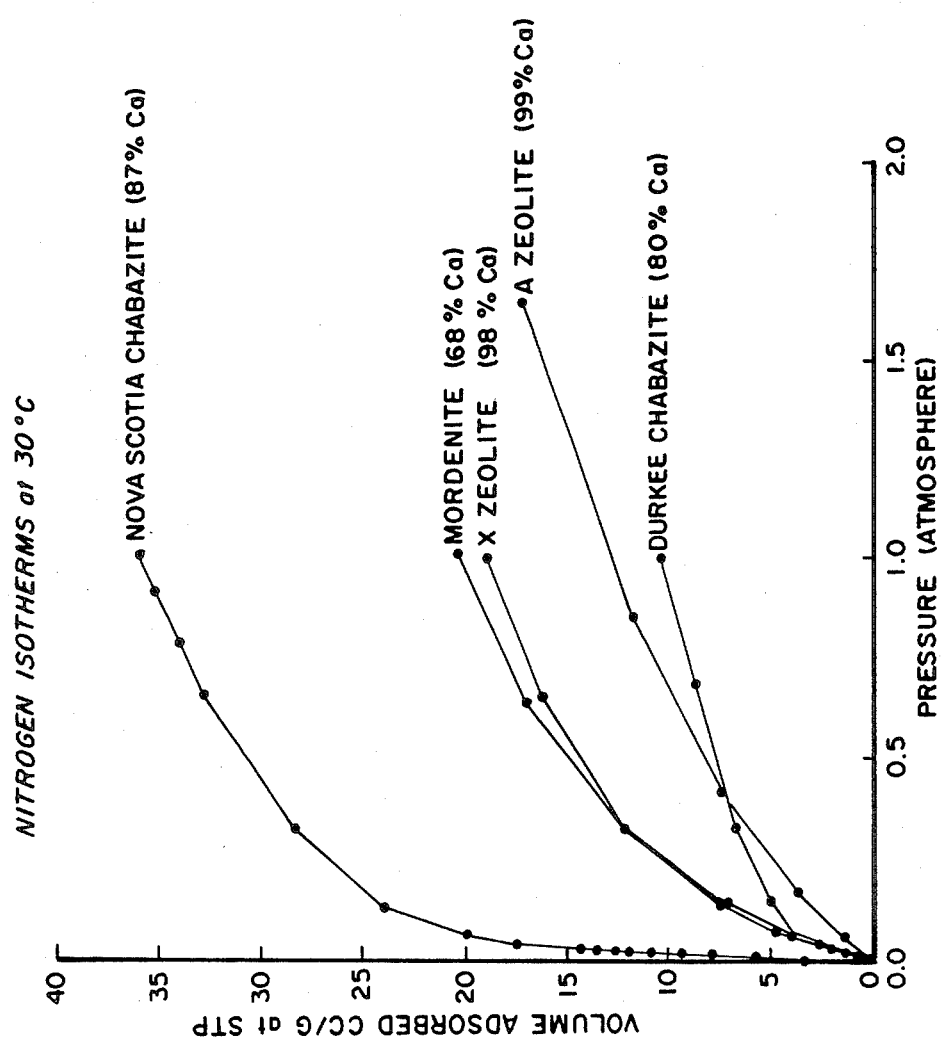

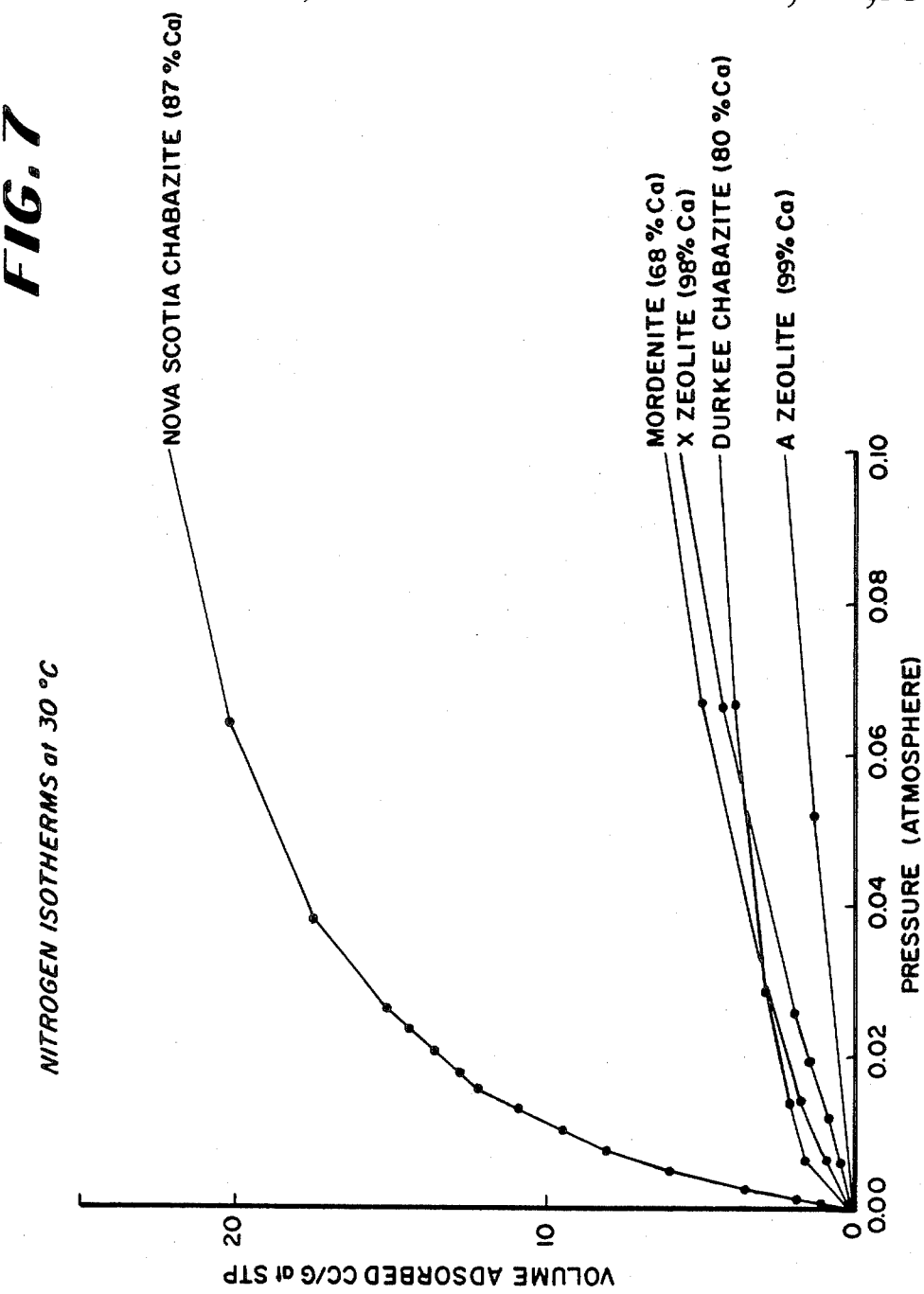

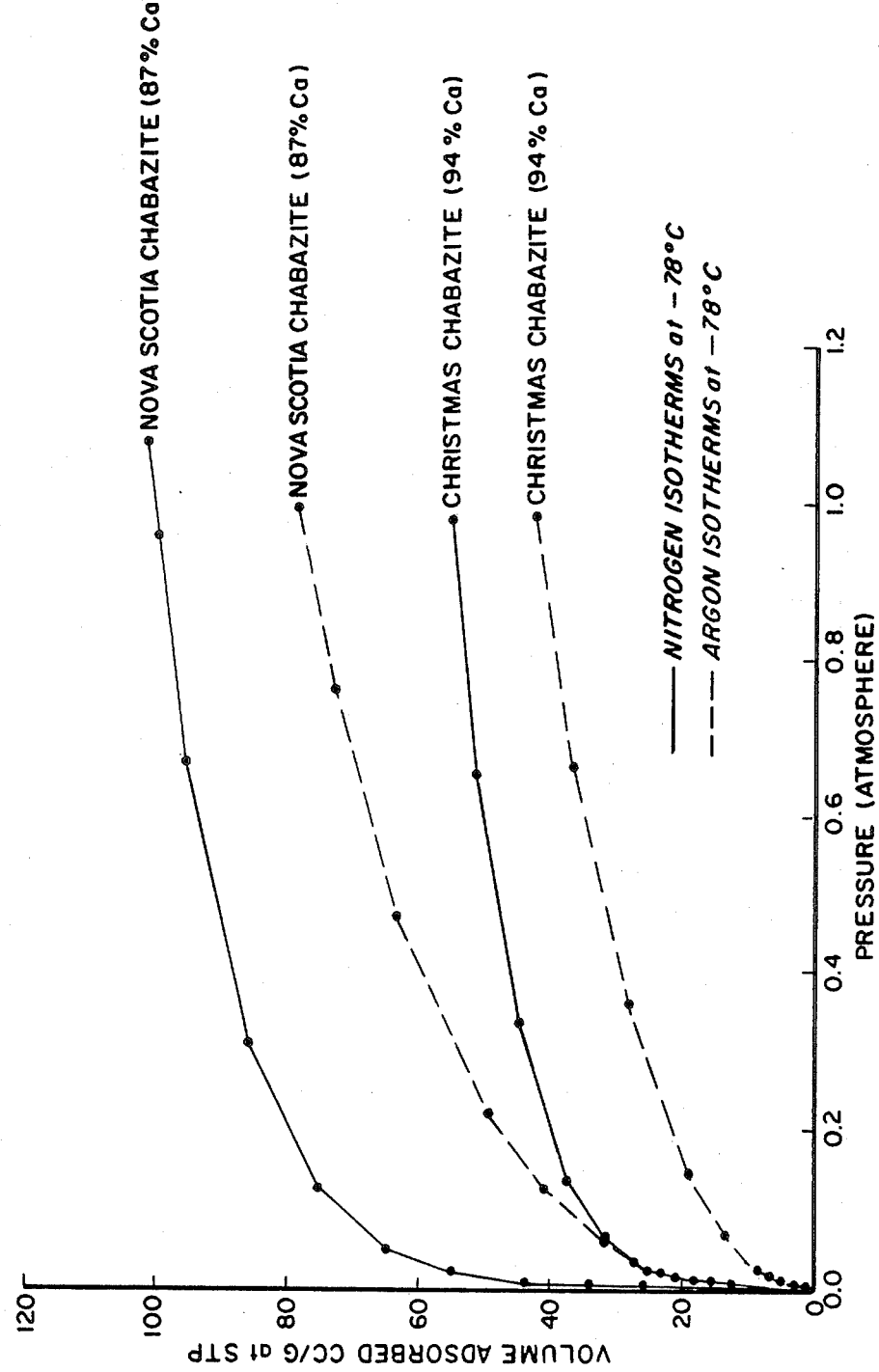

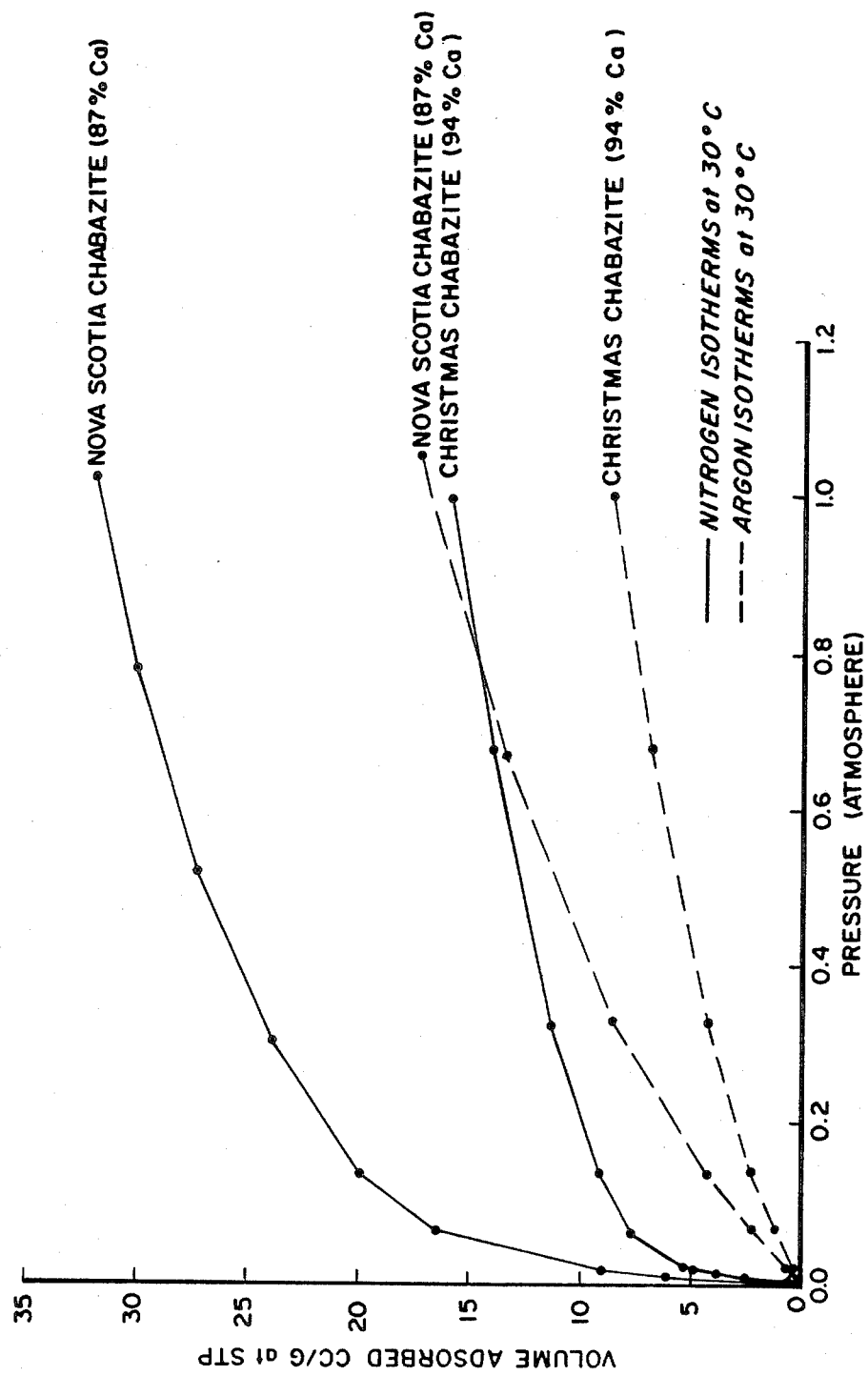

PROCESS FOR THE PURIFICATION OF PERMANENT GASES USING CHABAZITE ADSORBENTS

The present application is a continuation-in-part of U.S. Ser. No. 06/866,544 filed May 22, 1986, now abandoned. The specification of U.S. Ser. No. 06/866,544 is incorporated into this application by this reference.

TECHNICAL FIELD

The present invention relates to a process for the purification of permanent gases, i.e. the removal of trace impurities, utilizing a polyvalent exchanged, thoroughly dehydrated, chabazite adsorbent.

BACKGROUND OF THE INVENTION

Market pressures are causing gas suppliers to increase their purity standards in several electronic grade gases. The industry is demanding purer gases and verification of contaminant levels requiring improvements in methods for purifying and analyzing the gases supplied.

Conventional molecular sieves do not have sufficient gas capacity for weakly interacting adsorbates, such as nitrogen, to have practical utility. It is well known that due to their stronger interactions with zeolites, polar or polarizable adsorbates are selectively adsorbed from a mixture of less polarizable species. Adsorbates such as $CO_2$, water, and the like are readily adsorbed in a variety of zeolites at low partial pressures even at ambient temperatures due to their large heats of adsorption. In theory, any adsorbent having a type I isotherm (which includes all zeolites) will have some capacity for a given adsorbate in the Henry Law region (i.e. at low partial pressures). However, only chabazite in the appropriate ion form and thoroughly dehydrated has sufficient capacities for nitrogen and the like to have improved utility as a purifier. In addition, gases having significant induced or permanent dipoles such as CO or $CO_2$ should have sufficiently high adsorption properties to allow removal from other bulk gases possessing lower affinities using conventional zeolites. However, the polyvalent chabazites should also be superior in these applications since they have greater capacity for a given adsorbate at low partial pressures.

In practice, the improved capacity results in either: (1) longer times between regenerations or replacements, or (2) the use of smaller beds in cyclic processes. The discovery of the intrinsic properties of polyvalent chabazites expands the range of adsorbates which can be removed from a bulk gas using standard adsorption processes.

The calcium form of mordenite is the only other zeolite known to be useful for removing $N_2$ from argon. Compared to the mordenites, the chabazites of this invention are significantly better. Savage, in U.S. Pat. No. 3,597,169, teaches the use of molecular sieves to selectively adsorb liquid methane from liquid oxygen and claims that a wide variety of zeolites are useful, including chabazite. However, the specific examples and claims only cover certain ion forms of X zeolites. Unlike this process, the selective adsorption of weakly interacting adsorbates such as $N_2$ at temperatures well above their liquefaction point is very dependent on the adsorption properties of a particular zeolite. In the applications of this invention, chabazite is in a class by itself. This is an unexpected result; among the more well-studied zeolites, chabazites seem to be unique in the magnitude of their capacity and selectively for weakly interacting adsorbates.

Titanium sponges held at 800° C. are also used to remove nitrogen from gases. These adsorbents are irreversible and in addition these units only operate at very high temperatures and require the use of more expensive materials of special construction.

SUMMARY OF THE INVENTION

The present invention relates to an improvement to a process for the selective adsorption of one or more minor constituents from a bulk gas stream containing one or more minor constituents, wherein the bulk gas stream containing one or more minor constituents is contacted with a zeolitic adsorbent, and wherein the minor constituent to be separated has a heat of adsorption greater than the bulk gas or the bulk gas is size excluded from the pore structure of the zeolitic adsorbent. The improvement for separating the minor constituents comprises utilizing a dehydrated chabazite adsorbent and operating the process under conditions such that the partial pressure of the minor constituent is in the linear low pressure region of the isotherm for the minor constituent. The linear low pressure region being defined as that portion of the isotherm where the ratio of the change in volume adsorbed to the change in pressure is at least 200 cc (at STP)/g-atm. The dehydrated chabazite adsorbent used in the process has a residual water content of less than 1.5 wt% as the zeolitic adsorbent and at least 50% of any exchangeable ion capacity exchanged with a polyvalent metal cation.

BRIEF DESCRIPTION OF THE DRAWING

FIG. 1 depicts nitrogen isotherm data at 30° C. for various highly calcium exchanged, thoroughly dehydrated chabazites.

FIG. 2 details the nitrogen isotherm data at 30° C. for various highly calcium exchanged, thoroughly dehydrated chabazites depicted in FIG. 1 in the low pressure or Henry Law region.

FIG. 3 depicts nitrogen isotherm data at 30° C. for thoroughly dehydrated Nova Scotia chabazites at various levels of calcium exchange.

FIG. 4 depicts nitrogen isotherm data at 30° C. for two highly ion exchanged, thoroughly dehydated Nova Scotia chabazites comparing calcium and strontium as the exchange ion.

FIG. 5 details the nitrogen isotherm data at 30° C. depicted in FIG. 4 in the low pressure or Henry Law region.

FIG. 6 depicts nitrogen isotherm data at 30° C. for various highly calcium exchanged, thoroughly dehydrated zeolites.

FIG. 7 details the nitrogen isotherm data at 30° C. for various highly calcium exchanged, thoroughly dehydrated zeolites depicted in FIG. 6 in the low pressure or Henry Law region.

FIG. 8 depicts nitrogen and argon isotherm data at −78° C. for two highly ion exchanged, thoroughly dehydrated chabazites comparing a sedimentary and a macrocrystalline source of chabazite.

FIG. 9 depicts nitrogen and argon isotherm data at 30° C. for two highly ion exchanged, thoroughly dehydrated chabazites comparing a sedimentary and a macrocrystalline source of chabazite.

DETAILED DESCRIPTION OF THE INVENTION

Properly activated, various ion forms of chabazite display unusually high heats of adsorption for weakly interacting gases such as nitrogen. These higher heats lead to a significant increase in their ability to separate weakly adsorbing gases, particularly at low partial pressures for a given set of conditions. This separating ability is a direct consequence of the difference in the heats of adsorption for the adsorbates of interest.

It is known that the heat of adsorption for a given adsorbate is strongly influenced by the nature of the charge compensating cation which is interacting with the adsorbate. Any water, hydroxyl group, or other ligand interacting with these cations will lower its effective charge density and, therefore, decrease the heat of adsorption. For weakly interacting adsorbates, this drop in $\Delta H$ can be large enough to reduce or, in some cases, totally eliminate the selectivity for $N_2$ over $O_2$.

Past work clearly showed the effect of thermal activation procedures on the adsorption properties of highly exchanged polyvalent forms of zeolitic adsorbents. Compared to the sodium form, longer times and/or higher temperatures were needed to fully dehydrate polyvalent forms of zeolites. This is particularly true for chabazites. Previous workers in the field of gas adsorption failed to recognize that the conditions required to achieve this level of dehydration vary depending upon the nature of the charge compensating cations. It is much more difficult to activate, for example, the polyvalent forms of chabazite compared to the sodium form of chabazite. Since the zeolites in the prior art were not thoroughly dehydrated, intrinsic thermodynamic properties associated with these zeolites were not observed. Thus, it is a key step of this invention to thoroughly dehydrate the highly exchanged chabazite so the water content is not greater than 1.5% by weight, preferably no greater than 0.5 wt%.

When completely dehydrated and at least 50% calcium exchanged, chabazite exhibits unusually high limiting heats of adsorption for weakly interacting adsorbates. As taught in a co-pending U.S. patent application Ser. No. 06/866,544, this property allows oxygen to be quantitatively separated from argon. It is believed that the oxygen/argon separation is a direct result of the electric field density surrounding these cations being sufficiently high to interact effectively with the small quadrapole of oxygen allowing it to be separated from argon. Oxygen, with its smaller quadrapole compared to nitrogen and concomitantly smaller degree of interaction with a given electrostatic energy field, is much less sensitive to the charge density of the cation present and requires the presence of very high electric fields to be selectively adsorbed from adsorbates having similar energetics, but no quadrapole moment such as argon.

No reports of any chabazite displaying nitrogen heats of adsorption in the region of 10 kcal/mole have been found in the literature. Italian researchers disclose that calcium chabazite gives the highest nitrogen/oxygen selectivitices for the bulk separation of air, but do not mention or discuss the separation of argon from oxygen. It is not reasonable to expect that the same adsorption properties, which gives rise to practical adsorption capacities for purification applications are necessarily the same as those needed for bulk gas separations. Further, the data and experimental procedures presented suggest that the calcium chabazites were not thoroughly dehydrated and, therefore, would not have exhibited the high heat of adsorption for nitrogen. We have found that thoroughly dehydrated chabazites in the appropriate ion form display excellent properties for purifying bulk gases.

According to the laws of adsorption technology, any adsorbent can be used to affect the separation of a gaseous mixture in two ways: (1) using a carrier gas stream (such as GC analysis), or (2) by the principle of frontal analysis. Since, as taught in U.S. Ser. No. 06/866,544, the polyvalent forms of chabazite can effectively separate oxygen and nitrogen from argon, it should be possible to remove oxygen and nitrogen from argon by the principle of frontal analysis. The efficiency of such a process will depend on a number of factors including the concentrations of the components to be removed, temperature of the process, and adsorption properties of the various gases on the particular adsorbent.

Due to the high heats of adsorption for nitrogen exhibited by the thoroughly dehydrated polyvalent forms of chabazite, these adsorbents have sufficient nitrogen capacity to have practical utility for removing nitrogen impurities from argon. This is a direct consequence of the thermodynamic adsorption properties of these adsorbents. The calcium form of chabazite has a limiting nitrogen heat of adsorption of $-11.0$ kcal/mole and a nitrogen/argon selectivity of 15 at 30° C. The high values for these intrinsic properties are directly responsible for the increased capacity of these adsorbents for nitrogen in the presence of argon.

Even though these same adsorbents display the capability of separating oxygen from argon in a chromatographic application, both the gas capacity and oxygen/argon selectivity are much too low to have practical utility for removing oxygen from argon. On the other hand, gases having significant quadrapole moments or permanent dipole moments should have sufficiently high adsorption properties that they can be removed from other bulk gases possessing lower adsorption properties.

In general, the materials of this invention display improved properties for removing low levels of gas contaminants having larger heats of adsorption than the bulk component. Other gas purifications which should be possible include:

dilute CO from $H_2$
dilute $N_2$ from $H_2$
dilute $CH_4$ from $H_2$
dilute $CH_4$ from $N_2$
dilute $N_2$ from noble gases
trace $O_2$ from noble gases
trace $O_2$ from $H_2$ Noble gases include helium, neon, argon, krypton and xenon.

Also, the combination of the shape-selective properties of the small pored chabazites and their increased heat of adsorption suggests that this class of adsorbents would be superior for removing nitrogen or other weakly interacting gases from bulk gases whose kinetic diameter exceeds that of the adsorbent's pore opening, i.e. $CF_4$ can be purified in this manner.

Chabazite is a naturally occurring small pore zeolite which has a three-dimensional channel system and three-fold symmetry. The structure consists of stacked double six ring prisms (D6R units), interconnected through four rings producing a cubic close packed structure. The layers of six rings are linked by tilted four rings producing a highly porous structure. R. M. Barrer in "Zeolites and Clay Minerals as Molecular Sieves" gives a more complete description of the chabazite structure. Chabazite is one of the most porous natural zeolites known and has a void volume of 0.47 cc/cc. The pore opening to the large cavity which is accessible to $N_2$, $O_2$, and the like is through an 8-membered ring having an aperture of 3.7×4.2A. Normal paraffins are the largest molecules which freely adsorb in chabazite. Chabazite has a typical unit cell composition of $Ca_2\text{-}(Al_4Si_8O_{24})\cdot 13H_2O$ with Si/Al ratios from 1.6 to 3.0. Although natural chabazites usually have the majority of extra framework cations as either calcium or strontium, sodium and potassium forms are also known.

Chabazites can be found in many parts of the world and are fairly common. A thorough listing of various localities can be found in Gottardi and Galli's text [*Natural Zeolites*, Springer-Verlag, New York (1985)] and references therein. Chabazites may be found in either sedimentary or volcanic deposits. Sedimentary chabazites are common and occur in medium or high grade ores in the western United States. Most sedimentary chabazites contain varying amounts of clinoptilolite, erionite, and mordenite. In some cases, these contaminant zeolitic phases are not detected by X-ray and can greatly complicate the interpretation of experimental results.

In this invention chabazite is meant to include a large number of synthetic zeolites having the chabazite topology and included under the general IUPAC structure code of chabazite (CHAB). These phases could have minor variations in their crystal structure.

Activation of the calcium chabazite to a level of optimum performance can be carried out by any method which will remove all the water from the zeolite cavity, including that surrounding the cations without causing structural collapse of the zeolite. To achieve this in a practical manner, a temperature of 400°-500° C. should be maintained while the adsorbent is purged with a brisk flow of a non-reactive gas. Alternatively, the adsorbent can be activated to similar temperatures under vacuum. Increasing the number of divalent cations accessible to nitrogen will improve the adsorption capacity. For purification, the higher the exchange level of the polyvalent cation, the better. At the least, a majority of the exchangeable ions should be in the divalent form.

In order to demonstrate the efficacy of the present invention, several samples of naturally occurring chabazites along with a sample of a synthetically produced chabazite and a sample of commercially available chabazite were ion exchanged, dehydrated and analyzed to determine their nitrogen isotherm. The preparation and results of these samples are presented in the following examples.

In order to determine the effect of differing sources of the chabazite, the following three Examples were run.

EXAMPLE 1

Four samples of different naturally occurring chabazites along with a sample of a commercially available chabazite were ion exchanged to produce a highly calcium exchanged chabazite form of each sample. In the exchange of the samples, a 500 g portion of the sample was exchanged with a one liter portion of 1M $CaCl_2$. The 1M $CaCl_2$ was added slowly to the zeolite contained in a two liter round-bottom flask equipped with a condenser. The solution was brought to reflux over a 30 minute period and held for at least an additional hour. The exchange solution was decanted and the sample washed three times with approximately two liter portions of distilled water. After the wash, a fresh one liter portion of 1M $CaCl_2$ was added to the sample and the contents were brought to reflux. The exchange and wash procedures were repeated so as to have a minimum of three exchanges. After the final wash the sample was placed in a flat pan and air dried. The source of each sample, the final calcium exchange content and the number of exchanges necessary to achieve the calcium content are shown in Table I. The ion exchange levels reported in Table I are based on the $M^{n+}/Al$ ratio expressed as equivalents and represents the lower limit of the exchange level. This value is only accurate if all the aluminum present in the sample is contained within the zeolite framework.

TABLE I

| Sample Source | Calcium Exch. | No. Exchs. |
|---|---|---|
| Nova Scotia, Canada | 87% | 0 |
| Bowie, Arizona, USA | 99% | 4 |
| Christmas, Arizona, USA | 94% | 4 |
| Linde ® AW-500 | 88% | 4 |
| Durkee, Oregon, USA | 80% | 4 |

Prior to measuring adsorption isotherms, the exchanged samples were thoroughly dehydrated by being heated at 2° C./min to a final temperature of 400° C. and held there for a period of 16–18 hours; this heat treating process is carried out while under a $<10^{-4}$ mm Hg vacuum.

EXAMPLE 2

A synthetic chabazite was produced according to the procedure described in British Pat. No. 841,812. The resultant chabazite, which was fully calcium exchanged, was thoroughly dehydrated by being heated at 2° C./min to a final temperature of 400° C. and held there for a period of 16–18 hours; this heat treating process is carried out while under a $<10^{-4}$ mm Hg vacuum.

EXAMPLE 3

The thoroughly dehydrated, highly calcium exchanged samples of Examples 1 and 2 were tested to determine their nitrogen adsorption capability. The resultant nitrogen isotherms at 30° C. are shown in FIGS. 1 and 2. FIG. 1 shows the nitrogen isotherm for each sample over a range of pressures, 0–1 atms; FIG. 2 illustrates the low pressure region (Henry Law region).

In order to determine the effect of exchange level and ion form on the present invention, the following two examples were run.

EXAMPLE 4

Five uniform samples of Nova Scotia chabazite were exchanged with 1M $CaCl_2$ to varying levels of calcium exchange using the procedure of Example 1. The level of exchange for the resultant chabazites are listed in Table II.

TABLE II

| Sample Source | Calcium Exch. |
|---|---|
| Nova Scotia, Canada | 91% |
| Nova Scotia, Canada | 83% |
| Nova Scotia, Canada | 39% |
| Nova Scotia, Canada | 31% |
| Nova Scotia, Canada | 6% |

The exchanged chabazites were then thoroughly dehydrated and analyzed for nitrogen adsorption capability. The resultant isotherms are shown in FIG. 3. As can be seen from FIG. 3, increasing calcium exchange greatly enhances the adsorption capability in the low pressure region.

EXAMPLE 5

A sample of Nova Scotia chabazite was converted to the strontium form to determine the effect of different cations. The strontium exchanged sample was prepared from the sodium form of Nova Scotia chabazite. Reducing the calcium content of the Nova Scotia chabazite to below 10% required refluxing of the Nova Scotia chabazite in 5M NaCl seven times over a period of 17 days. Five exchanges, each for a period of twenty four hours, with 1M $SrCl_2$ produced the chabazite with the 88% strontium loading. A sample of natural Nova Scotia chabazite containing 88% calcium was also used in the Example as a comparison. Both the strontium exchanged sample and the natural chabazite were then dehydrated and nitrogen isotherms for the exchanged dehydrated samples were run. These isotherms are shown in FIGS. 4 and 5. FIG. 4 shows the isotherms over a range of pressures; FIG. 5 details the isotherms in the low pressure region. As can be seen from FIG. 5, the nitrogen adsorption properties in the low pressure region of the strontium and calcium chabazites exchanged to the sample extent are similar. Calcium, as expected, is slightly better than strontium due to its higher charge density.

In order to show the effectiveness of chabazite forms of zeolites over other forms, an X zeolite, an A zeolite and a mordenite were exchanged, dehydrated and analyzed for nitrogen adsorption effectiveness. The results of these tests is shown in the following example.

EXAMPLE 6

Samples of X and A zeolite along with a sample of mordenite were ion exchanged with 1M $CaCl_2$ utilizing the procedure of Example 1. The resultant exchanged samples were then thoroughly dehydrated and nitrogen isotherms for each sample were run. All of these samples contain at least 80% zeolite. FIGS. 6 and 7 illustrate those isotherms. In addition, for reference, the best and worst chabazites, Nova Scotia and Durkee, respectively, are shown. The 0-1 atms pressure range isotherms are shown in FIG. 6; FIG. 7 details the low pressure region. Although the Durkee chabazite has overall lower adsorption properties than the preferred Nova Scotia chabazite, it illustrates a key point of this invention. The high nitrogen heat of adsorption for Ca chabazite is reflected in the isotherm shape. Note that at ambient pressures (around one atmosphere) CaX, CaA and Ca Mordenite have higher nitrogen capacities compared to Durkee Ca chabazite. However, at pressures below 0.02 atmosphere (the region of interest for removing ppm levels of nitrogen contaminant) the Durkee Ca chabazite has a greater nitrogen capacity, see FIG. 7. It is important to note that small variations in crystallinity or the amount of zeolite present in these adsorbents cannot account for the large increase in the nitrogen adsorption properties observed for the Nova Scotia chabazite.

In order to demonstrate the adsorption capabilities for different gases, isotherms for argon and nitrogen were run for two naturally occurring chabazites, one sedimentary and one macrocrystalline as shown in the following example.

EXAMPLE 7

FIGS. 8 and 9 shows the nitrogen and argon isotherms at 30° C. and −78° C. for two typical chabazites of this invention: (1) a naturally occurring sedimentary chabazite from Christmas, Arizona which has been exhaustively calcium exchanged, and (2) a macrocrystalline sample from Nova Scotia having 88% of its exchange capacity in the calcium form. These isotherms clearly show the large selectivity for nitrogen over argon at these conditions. In addition, it is obvious that carrying out the purification at −78° C. increases the capacity of the adsorbent bed. Process studies are necessary to define the temperature where the optimum gas selectivity and capacity are available for a particular application.

The thermodynamic data alone is not sufficient to determine if the selectivity and capacity enhancements observed for calcium chabazite would provide a significant impact for a purification process. The following example shows the utility of calcium chabazite as a nitrogen scavenger.

EXAMPLE 8

The two chabazites of Example 1 above were placed in a packed bed adsorption unit. A fixed amount (0.49 lbs.) of Ca Christmas chabazite was charged to a 2-inch diameter stainless steel bomb. The adsorbent was dried by heating to approximately 800° F. while passing a 1.0 SCFH helium purge stream through the bed. These conditions were maintained for 12 hours during which the chabazite was observed to expel a substantial amount of water. The bed was allowed to cool to room temperature and was pressure cycled with argon at ambient temperature from 10 to 100 psig several times in order to remove any residual helium. Next, the bomb was submerged in a dry ice/methylene chloride bath at −110° F. Argon gas doped with a known nitrogen concentration was passed through the system shown in FIG. 1 at a fixed flow rate and 100 psig. The run was terminated when total breakthrough occurred as indicated by the outlet nitrogen concentration readings on the ion mobility analyzer. Regeneration was conducted by again heating to 800° F. overnight with a helium purge.

Several runs were performed using the Christmas chabazite. Similar operating procedures were followed in each of these runs; however, the nitrogen concentration in the inlet gas or the gas flow rate or both parameters were varied. The adsorbent was regenerated between each test.

The bomb was then emptied and refilled with 0.40 lbs. of highly crystalline Nova Scotia chabazite. The material was dried, and two runs were conducted using feed gas compositions of 11.5 ppm and 40.5 ppm $N_2$ in argon. The results from the above experiments are summarized in Table III.

TABLE III

| Chabazite | Inlet N₂ Concentration (ppm) | Gas Flow Rate (SCFH) | Capacity (lb. N₂/100 lb. Adsorbent) | Mass Transfer Zone Length (in) |
|---|---|---|---|---|
| Christmas | 10 | 15 | 0.00841 | 2.4 |
| Christmas | 10 | 30 | 0.00833 | 5.4 |
| Christmas | 11 | 15 | 0.00777 | 5.5 |
| Christmas | 40 | 40 | 0.0254 | 7.8 |
| Nova Scotia | 11.5 | 60 | 0.0205 | 7.4 |
| Nova Scotia | 40.5 | 25 | 0.0887 | 9.8 |

As expected, the adsorbent capacity was found to depend only on the inlet nitrogen partial pressure, and not the flow rate of the gas. A comparison of both adsorbents showed Nova Scotia chabazite to have about three times the scavenging ability of the Christmas chabazite, thus rendering it as a better adsorbent under the conditions tested.

EXAMPLE 9

The use of calcium chabazite prepared from AW-500 for nitrogen removal from argon was demonstrated in the testing of a bench-scale purification system. This system contained three vessels to remove impurities from argon, the first containing a copper catalyst for oxygen removal, the second containing 13X molecular sieve for $H_2O$ and $CO_2$ removal, and the third containing calcium chabazite for nitrogen removal.

The calcium chabazite vessel was approximately 2 inches in diameter and contained 370 grams of material. The bed was regenerated as in Example 5 and then submerged in a dry ice/methylene chloride bath at $-78°$ C. 40 SCFH of argon containing 37.5 vppm nitrogen and 9.5 vppm oxygen were compressed to 70 psig and passed through the purification system. Outlet nitrogen concentrations from the chabazite bed were as follows:

| Elapsed Time (hrs.) | Outlet Nitrogen Conc. (ppm) |
|---|---|
| 0 | ND <3 ppm |
| .30 | ND <3 ppm |
| .62 | ND <3 ppm |
| .93 | 6.5 |
| 1.2 | 16.0 |
| 1.5 | 18.0 |
| 1.9 | 23.0 |

Based on these results, the saturated bed capacity for the mixture was estimated as 0.02 g nitrogen per 100 g adsorbent. It should be noted that this nitrogen capacity may be lower than what could be ideally achieved since it is known that the feed gas to the chabazite bed did have about 1 vppm moisture present due to an experimental problem.

The separation of nitrogen from $CF_4$ provides an example of how these chabazite adsorbents are superior for removing gas contaminants from bulk gases which are too large to enter the zeolitic cavity, even if the heat of adsorption of the bulk gas is similar to that of the impurity.

EXAMPLE 10

Table IV summarizes the results for a series of GC studies which demonstrate that calcium chabazite effectively excludes $CF_4$ and can be used to remove nitrogen and oxygen. Henry constants and isosteric heats determined by GC evaluation are given for nitrogen, oxygen, and $CF_4$. No studies were carried out with CO, but it is expected that it will be readily adsorbed on any of these adsorbents since it has a permanent dipole.

TABLE IV

| Entry | Adsorbent | Major Cation Form(s) | Henry Constants at 30° C. (mmoles/g atm) | | | Isosteric Heats (kcal/mole/°K.) | | |
|---|---|---|---|---|---|---|---|---|
| | | | $O_2$ | $N_2$ | $CF_4$ | $O_2$ | $N_2$ | $CF_4$ |
| 1 | NaA (4A) | Na | 0.030 | 0.17 | NA | −4.86 | −5.10 | NA |
| 2 | CaA (5A) | Na, Ca | 0.107 | 0.400 | 1.172 | −3.82 | 5.58 | 5.46 |
| 3 | NaX (13X) | Na | 0.084 | 0.245 | 0.918 | −3.49 | −4.74 | −5.302 |
| 4 | Chabazite | Na, Ca | 0.232 | 0.994 | 0.054 | −5.25 | −6.81 | −5.84* |
| 5 | Chabazite | Ca | 0.766 | 9.80 | 0.075 | −6.67 | −11.11 | −6.90* |
| 6 | Na Mordenite | Na | 0.305 | 2.18 | 0.0153 | −4.29 | −9.14 | −6.18* |
| 7 | Ca Mordenite | Ca | 0.411 | 3.78 | 0.007 | −6.62 | −9.56 | −6.78* |

*$CF_4$ Henry constant indicates minimal adsorption; this minimal adsorption is most likely on the surface and not in micropores.
NA - not adsorbed Sodium A zeolite is a small pore zeolite which totally excludes $CF_4$. (The retention time for $CF_4$ is less than that for the inert Ne used to obtain dead volume for the column.) The nitrogen and, particularly, oxygen capacity (indicated by the Henry constants) on this adsorbent are impracticably low. Ca exchange of NaA results in a larger pore zeolite which adsorbs $CF_4$ readily and has a $CF_4$ capacity 3 times that for nitrogen and 12 times that for oxygen; therefore, it is totally ineffective for $CF_4$ cleanup. Sodium X is a large pore faujasite in which $CF_4$ has over three times the capacity of nitrogen and also would be ineffective for a $CF_4$ purification process. It is reasonable to expect that any ion form of X or A zeolite would be inappropriate to use for this application.

Table IV shows the large improvement in capacities that are achieved for oxygen and nitrogen in the low pressure region by using a chabazite molecular sieve; the chabazite has twice the oxygen and nitrogen capacity as CaA and essentially excludes $CF_4$. The small Henry constants (K<0.1) for $CF_4$ are inconsistent with the $\Delta H$ values and are most likely due to strong surface adsorption of a small quantity of $CF_4$. It is noteworthy that while nitrogen and $CF_4$ have comparable heats of adsorption on chabazite, the Henry constant is much smaller for $CF_4$. This strongly suggests that $CF_4$ is largely excluded from the zeolite micropores, but adsorbs to a negligible extent on the external surface of the crystals.

The calcium exchanged form of Linde chabazite results in an additional ten-fold increase in the nitrogen capacity at the pressures of interest. The large rise in isosteric heats for nitrogen and oxygen is consistent with the observed increases in capacity.

Mordenites in the sodium and calcium form were also evaluated. They exclude $CF_4$ and are substantially better than A or X type, but inferior to the chabazites.

The above results indicate that calcium chabazite should provide the most effective adsorbent for removing nitrogen and oxygen from $CF_4$. Lowering the operating temperature should result in further improvements and increase the nitrogen capacity significantly.

EXAMPLE 11

A vessel was charged with 228 g of calcium chabazite adsorbent. The material was then activated and cooled as described in Example 9. A feed gas containing 570 ppm nitrogen in $CF_4$ was passed through the bed at 6.15SCFH. Outlet nitrogen concentrations were as follows:

| Elapsed Time (hrs.) | Outlet Nitrogen Conc. (ppm) |
|---|---|
| 0.00 | ND <17 |
| 1.03 | ND <17 |
| 2.00 | ND <17 |
| 2.50 | ND <17 |
| 3.00 | ND <17 |
| 3.50 | ND <17 |
| 4.00 | ND <17 |
| 4.50 | ND <17 |
| 5.03 | 20 |
| 5.55 | 28 |
| 6.07 | 45 |
| 6.58 | 72 |
| 7.10 | 92 |
| 7.62 | 132 |
| 8.13 | 173 |
| 8.65 | 223 |
| 9.17 | 289 |
| 9.68 | 358 |
| 10.20 | 432 |
| 10.72 | 489 |
| 11.23 | 546 |
| 11.75 | 572 |

Based on these results, equilibrium capacity for the mixture was estimated as 0.40 g nitrogen per 100 g adsorbent. The same experiment run with Linde AW-500 Na/Ca chabazite (non-exchanged) showed a capacity of 0.13 g nitrogen per 100 g adsorbent. The higher overall capacities, as compared to the nitrogen/argon system, are due to the non-competitive nature of the nitrogen/$CF_4$ separation, i.e. $CF_4$ does not enter the zeolite.

EXAMPLE 12

The same experiment conducted in Example 11 was run identically, except that the feed gas contained 4600 ppm nitrogen in $CF_4$. Outlet nitrogen concentrations were as follows:

| Elapsed Time (hrs.) | Outlet Nitrogen Conc. (ppm) |
|---|---|
| 0.00 | ND <17 |
| 0.52 | ND <17 |
| 1.03 | ND <17 |
| 1.55 | 263 |
| 2.07 | 1280 |
| 2.58 | 1372 |
| 3.10 | 5066 |
| 3.62 | 3521 |
| 4.13 | 5143 |
| 4.65 | 4384 |

Based on these results, equilibrium capacity for the mixture was estimated as 1.17 g nitrogen per 100 g adsorbent. The same experiment run with Linde AW-500 Na/Ca chabazite (non-exchanged containing 59% calcium) showed a capacity of 0.54 g nitrogen per 100 g adsorbent.

The present invention has been described with reference to specific embodiments thereof. These embodiments should not be viewed as a limitation of the scope of the present invention; such scope being ascertained by the following claims.

We claim:

1. In a process for the selective adsorption of one or more minor constituents from a bulk gas stream containing one or more minor constituents, wherein the bulk gas stream containing one or more minor constituents is contacted with a zeolitic adsorbent, and wherein the minor constituent to be separated has a heat of adsorption greater than the bulk gas or the bulk gas is size excluded from the pore structure of the zeolitic adsorbent, the improvement for separating the minor constituents comprises utilizing a dehydrated chabazite adsorbent having a residual water content of less than 1.5 wt% as the zeolitic adsorbent, wherein the dehydrated chabazite adsorbent has at least 50% of any exchangeable ion capacity exchanged with a polyvalent metal cation; and operating the process under conditions such that the partial pressure of the minor constituent is in the linear low pressure region of the isotherm for the minor constituent.

2. The process of claim 1 wherein the minor constituent is nitrogen and the bulk gas is argon, hydrogen, helium, krypton, neon, xenon, tetrafluoromethane or mixtures thereof.

3. The process of claim 1 wherein the minor constituent is carbon monoxide, nitrogen, methane or mixtures thereof and the bulk gas is hydrogen or helium.

4. The process of claim 1 wherein the polyvalent metal cation is a divalent metal.

5. The process of claim 1 wherein the polyvalent metal cation is an alkaline earth metal.

6. The process of claim 1 wherein the polyvalent metal cation is calcium.

7. The process of claim 1 wherein the polyvalent metal cation is strontium.

* * * * *